United States Patent
Dziurda et al.

(10) Patent No.: US 9,409,529 B2
(45) Date of Patent: Aug. 9, 2016

(54) CAMERA SYSTEM AND VEHICLE

(71) Applicant: GM GLOBAL TECHNOLOGY OPERATIONS LLC, Detroit, MI (US)

(72) Inventors: Robert A. Dziurda, Waterford, MI (US); Joel P. Ruschman, Beverly Hills, MI (US); Frank W. Meinert, Shelby Township, MI (US); Caroline Chung, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/506,713

(22) Filed: Oct. 6, 2014

(65) Prior Publication Data

US 2016/0096486 A1 Apr. 7, 2016

(51) Int. Cl.
*H04N 5/225* (2006.01)
*B60R 11/04* (2006.01)
*H04N 7/18* (2006.01)
*B60R 1/00* (2006.01)
*B60H 1/26* (2006.01)

(52) U.S. Cl.
CPC ...... *B60R 11/04* (2013.01); *B60H 1/26* (2013.01); *B60R 1/00* (2013.01); *H04N 7/183* (2013.01); *B60R 2300/101* (2013.01); *B60R 2300/60* (2013.01)

(58) Field of Classification Search
CPC .......... B60R 11/04; B60R 1/00; B60R 1/006; B60R 1/06; B60R 1/10; B60S 1/0848
See application file for complete search history.

(56) References Cited

U.S. PATENT DOCUMENTS

| | | | | |
|---|---|---|---|---|
| 5,179,470 A * | 1/1993 | Olson | .................. | B60R 1/0602 359/507 |
| 6,793,416 B2 * | 9/2004 | Peterson | ................ | G03B 17/02 348/143 |
| 2003/0155001 A1 * | 8/2003 | Hoetzer | ............... | B60S 1/0822 134/37 |
| 2007/0291130 A1 * | 12/2007 | Broggi | .................. | G01S 17/023 348/218.1 |
| 2012/0176532 A1 * | 7/2012 | Hara | ...................... | G03B 13/36 348/352 |
| 2012/0268599 A1 * | 10/2012 | Schmidt | ................... | B60R 1/00 348/148 |
| 2013/0002936 A1 * | 1/2013 | Hirama | ............. | H04N 5/23212 348/349 |
| 2013/0215271 A1 * | 8/2013 | Lu | ............................ | H04N 7/18 348/148 |
| 2014/0104426 A1 * | 4/2014 | Boegel | ..................... | B60R 1/00 348/148 |

* cited by examiner

*Primary Examiner* — Amy Hsu
(74) *Attorney, Agent, or Firm* — Quinn Law Group, PLLC

(57) ABSTRACT

A camera system for a vehicle includes a body defining a cavity therein, and a camera including a lens. The camera is disposed in a deployed position such that the lens protrudes from the cavity. The camera system includes a debris region covering the lens and a duct disposed within the cavity. The duct defines a channel therein and has a first end spaced apart from the camera and a second end spaced apart from the first end. The duct is configured for directing an airstream through the channel from the first end to the debris region. A vehicle including the camera system is also disclosed.

15 Claims, 4 Drawing Sheets

CAMERA SYSTEM AND VEHICLE

TECHNICAL FIELD

The disclosure relates to a camera system for a vehicle.

BACKGROUND

Vehicles may include camera systems configured to monitor conditions exterior to the vehicle. For example, a camera system may monitor road surface conditions, traffic conditions, and/or a position of objects exterior to the vehicle. Since vehicles may operate in wet and/or dirty environments, such camera systems are often exposed to moisture and/or debris.

SUMMARY

A camera system for a vehicle includes a body defining a cavity therein, and a camera including a lens. The camera is disposed in a deployed position such that the lens protrudes from the cavity. The camera system also includes a debris region covering the lens and a duct disposed within the cavity. The duct defines a channel therein and has a first end spaced apart from the camera and a second end spaced apart from the first end. The duct is configured for directing an airstream through the channel from the first end to the debris region.

In one embodiment, the duct defines a plurality of channels therein arranged in a circular array about the debris region. The duct is configured for directing an airstream through the plurality of channels from the first end to the debris region.

A vehicle includes a frame and an airstream flowable around the frame. The vehicle also includes a camera system including a body attached to the frame and defining a cavity. The camera system further includes a camera including a lens, wherein the camera is disposed in a deployed position such that the lens protrudes from the cavity. The camera system also includes a debris region covering the lens and a duct disposed within the cavity. The duct defines a channel therein and has a first end spaced apart from the camera and a second end spaced apart from the first end. The duct is configured for directing the airstream through the channel from the first end to the debris region. The vehicle also includes a contaminant current disposed in fluid communication with the airstream.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
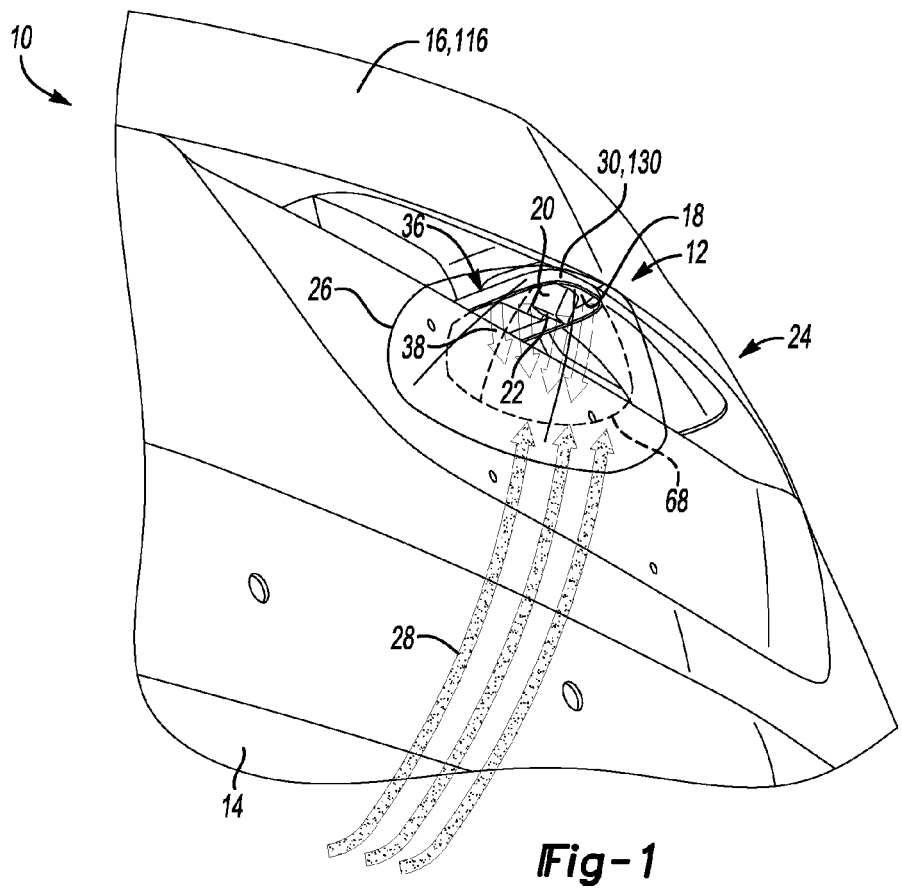
FIG. 1 is a schematic illustration of a perspective view of a portion of a vehicle including a camera system having a camera disposed in a deployed position.

Referring to the Figures, wherein like reference numerals refer to like elements, a vehicle 10 including a camera system 12 is shown generally in FIG. 1. The vehicle 10 and camera system 12 may be suitable for use during wet and/or dirty vehicle operating conditions in which the camera system 12 is exposed to moisture, debris, and/or contaminants. Therefore, the vehicle 10 and camera system 12 may be useful for automotive applications. Alternatively, the vehicle 10 and camera system 12 may be useful for non-automotive applications such as remote monitoring or security applications for industrial vehicles or aircraft.

As described with reference to FIG. 1, the vehicle 10 may be an automotive vehicle such as a passenger sedan, truck, or sport utility vehicle. As such, the vehicle 10 may be configured for transporting one or more occupants and/or goods. The camera system 12 may be situated at any location on an exterior of the vehicle 10 and may be arranged to provide monitoring of, for example, road surface conditions, traffic conditions, and/or a presence or position of an object external or adjacent to the vehicle 10. Therefore, the camera system 12 may be a component of an autonomous driving system, lane departure alert system, and/or object detection system for the vehicle 10. For example, in one non-limiting example as shown in FIG. 1, the camera system 12 may be a rearview or backup camera system 12 configured for monitoring conditions during forward or reverse travel of the vehicle 10.

Referring again to FIG. 1, the vehicle 10 includes a frame 14 configured for supporting one or more components of the vehicle 10, e.g., an axle (not shown), an internal combustion engine (not shown), and/or a battery (not shown). Further, the camera system 12 includes a body 16 attached to the frame 14 and defining a cavity 18 or recession therein. For example, the body 16 may be a component of the vehicle 10, such as, but not limited to, a rear decklid (shown generally at 116), a fascia, a bumper, a side body panel, a roof, and the like. The body 16 may be formed from any material, such as metal or plastic. For example, the body 16 may be formed from two sheet metal components welded together to define the cavity 18 therebetween.

Further, as shown in FIG. 1, the camera system 12 includes a camera 20 having a lens 22. The camera 20 may be any suitable type of camera 20, such as, but not limited to, an infrared camera, and the camera 20 may be formed from any suitable material according to vehicle or component styling. Generally, the lens 22 may be an optical lens having a field of vision adjacent to or in front of the camera 20 and may be configured for collecting light so that the camera 20 may produce an image. In addition, although not shown, the camera system 12 may include a plurality of cameras 20, e.g., two or more cameras 20 disposed within a respective one of a plurality of cavities 18 (not shown).

The camera system 12 may be further characterized as a fixed or stationary camera system 12 in which the camera 20 remains in a deployed position 24 such that the lens 22 protrudes from the cavity 18. That is, the camera 20 and lens 22 may produce an image when the camera 20 is disposed in the deployed position 24. Alternatively, the camera system 12 may be characterized as a deployable or retractable camera system 12 in which the camera 20 reversibly transitions between the deployed position 24 and a stowed position (not shown) such that the lens 22 is retracted into the cavity 18. That is, the camera 20 and lens 22 may not be visible to a vehicle operator when the camera 20 is disposed in the stowed position. Further, the camera system 12 may be described as a continuously-operational camera system 12 that operates and generate images when the vehicle 10 is operating, e.g., when the vehicle 10 is moving, when the vehicle 10 is parked, etc. Alternatively, the camera system 12 may be described as an on-demand or selectively-deployable camera system 12 that may operate only during certain vehicle operating conditions, e.g., when the vehicle 10 is parked, traveling in reverse, or operating at a certain speed, etc.

Referring again to FIG. 1, the camera system 12 also includes a debris region 26 covering the lens 22. The debris region 26 may surround and envelop the lens 22, and may represent a zone or area in which a contaminant current 28 may foul or obscure the lens 22. That is, the vehicle 10 further includes the contaminant current 28 flowable around the frame 14 towards the debris region 26. The contaminant current 28 may be a portion of an airflow about the body 16 during operation of the vehicle 10, and may include debris such as dust or dirt; contaminants such as grease or tar; and/or moisture from rain, standing water, road spray, or snow. In one non-limiting example, the contaminant current 28 may originate from underneath the frame 14 of the vehicle 10 and carry or deposit the aforementioned debris, contaminants, and/or moisture to the debris region 26. Therefore, the debris region 26 may be a three-dimensional space, e.g., a hemispherical zone, which may surround the lens 22.

In contrast, the vehicle 10 also includes an airstream 38 flowable around the frame 14. The airstream 38 may be another portion of the airflow across the body 16 during operation of the vehicle 10 that is substantially free from debris, contaminants, and/or moisture. That is, the airstream 38 may be characterized as a comparatively clean, ambient quantity of air that flows along the frame 14 and body 16 as the vehicle 10 travels along a surface. For example, the airstream 38 may flow along a side surface or a roofline or a window glass of the vehicle 10 during operation of the vehicle 10 as the vehicle 10 travels through the environment.

Figure 2:
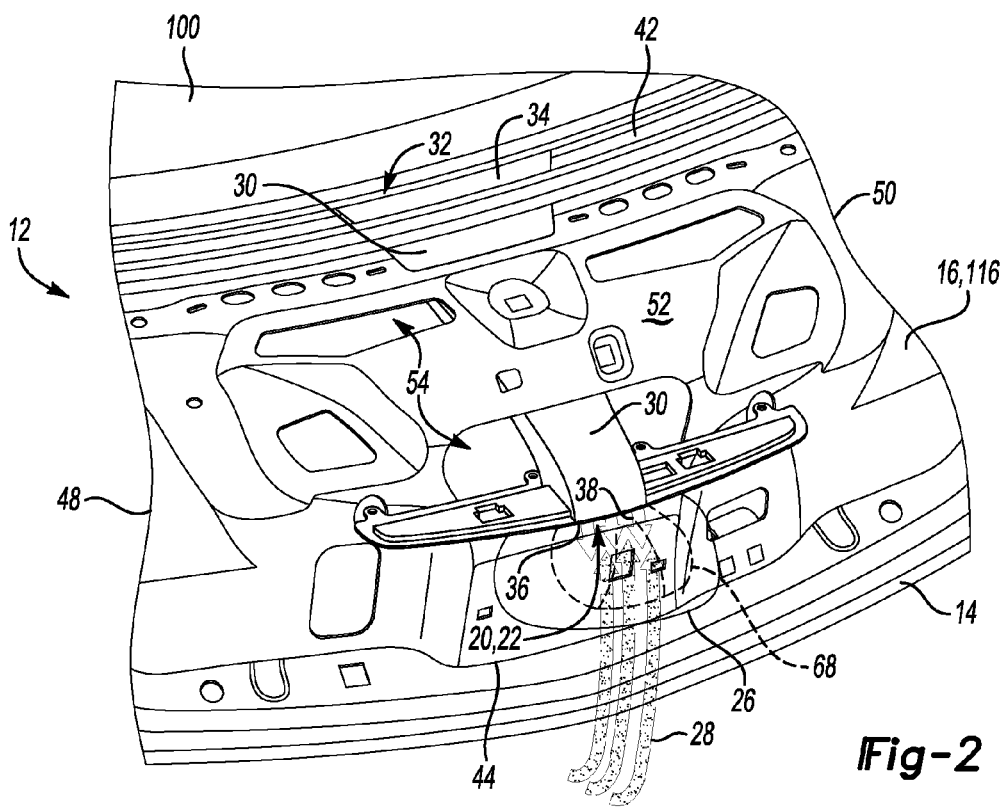
FIG. 2 is a schematic illustration of a perspective view of a duct of the camera system of FIG. 1.
Figure 3:
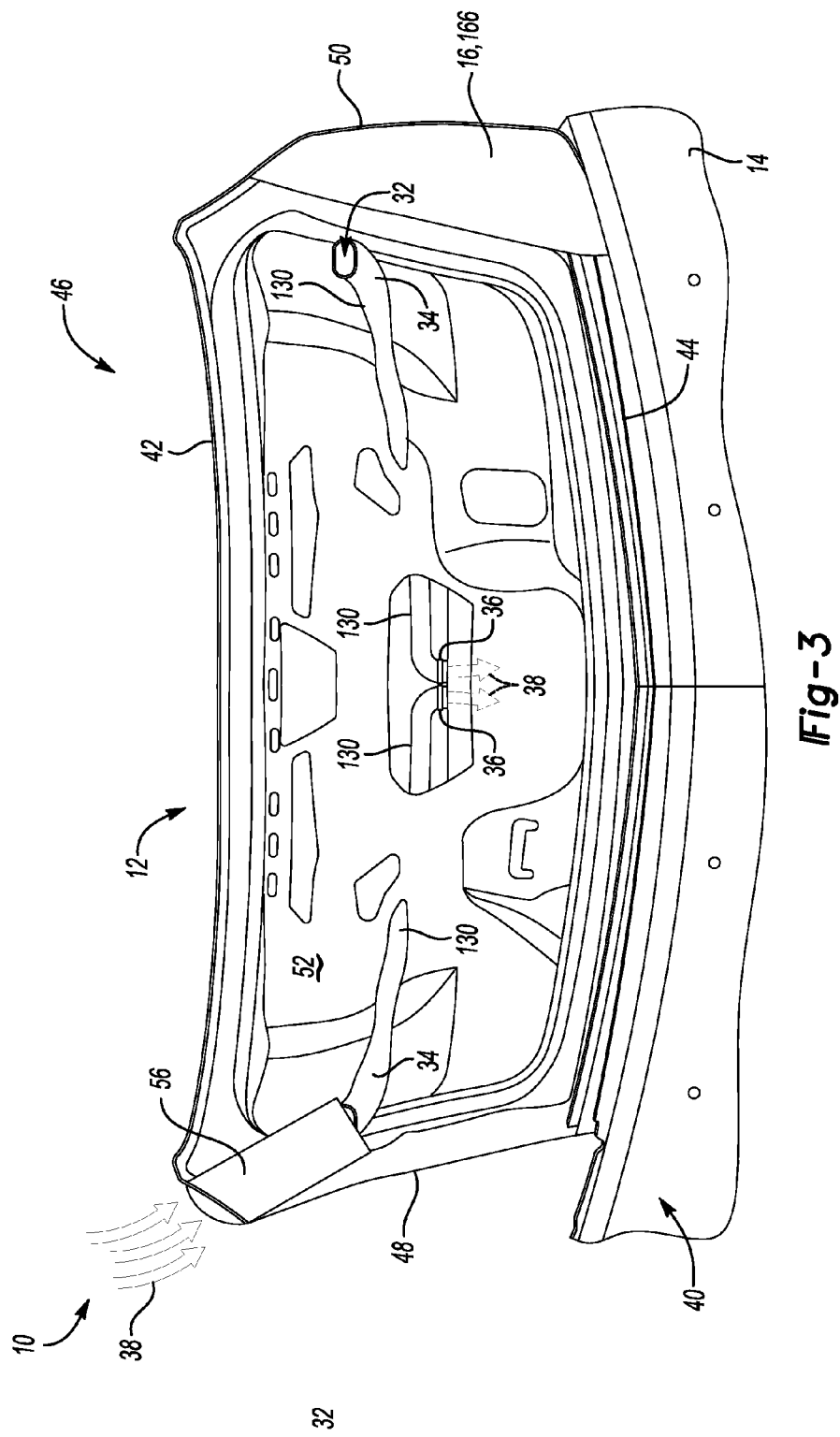
FIG. 3 is a schematic illustration of a perspective view of another embodiment of the duct of FIG. 2.
Figure 4:
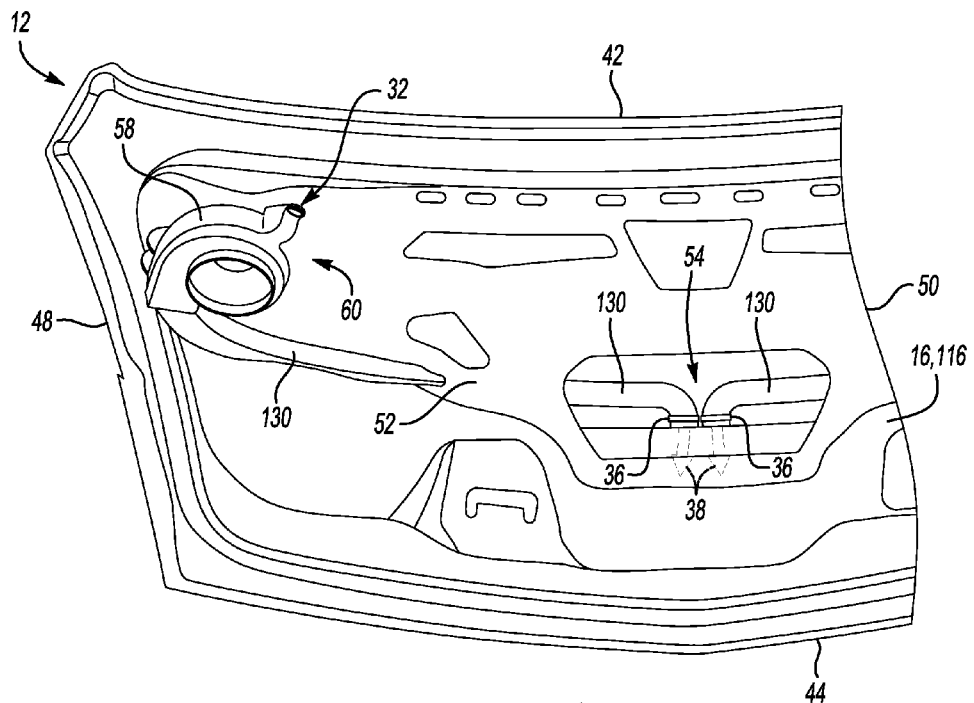
FIG. 4 is a schematic illustration of a perspective view of an air mover attached to the duct of FIG. 3.

Referring now to FIGS. 2-4, the camera system 12 further includes a duct 30 (FIG. 2), 130 (FIGS. 3 and 4), 230 (FIGS. 5 and 6) disposed within the cavity 18. As described with reference to FIG. 2, the duct 30 defines a channel 32 therein, and has a first end 34 spaced apart from the camera 20 and a second end 36 spaced apart from the first end 34. The duct 30 is configured for directing the airstream 38 through the channel 32 from the first end 34 to the debris region 26. That is, the second end 36 may be disposed in fluid communication with the debris region 26 such that the second end 36 ejects the airstream 38 into the debris region 26, as set forth in more detail below.

For example, as described with reference to FIG. 3, the body 16 may be the decklid 116 that is pivotably attached to the frame 14 of the vehicle 10 and configured for covering a trunk compartment 40 defined by the frame 14. More specifically, the decklid 116 may have a first edge 42 and a second edge 44 spaced apart from the first edge 42. When the decklid 116 is disposed in a closed position (shown generally at 46 in FIG. 3) and abuts the frame 14 of the vehicle 10 to thereby cover the trunk compartment 40, the first edge 42 may be disposed adjacent a rear window glass 100 of the vehicle 10. Conversely, the second edge 44 may sealingly abut a rear bumper or fascia when the decklid 116 is disposed in the closed position 46.

Further, the decklid 116 may also include a proximal edge 48 abutting the first edge 42 and the second edge 44, and a distal edge 50 spaced apart from the proximal edge 48 and abutting the first edge 42 and the second edge 44. In addition, the decklid 116 may have a surface 52 extending between the first edge 42 and the second edge 44 and defining a void 54 therethrough. That is, the surface 52 may extend between the first edge 42, the second edge 44, the proximal edge 48, and the distal edge 50 so that the decklid 116 has a generally rectangular shape.

In one embodiment as described with reference to FIG. 2, the duct 30 may extend from the first edge 42 through the void 54 and protrude from the surface 52. Therefore, the duct 30 may route or direct the airstream 38 from the first edge 42 through the surface 52 to the camera 20 and lens 22 (FIG. 1). The duct 30 may be formed from any suitable material, and the duct 30 and channel 32 may have any size and/or shape. However, generally, the duct 30 may be formed from a flexible, durable material such as a plastic or an elastomer so as to snake along the surface 52 and through the void 54 according to vehicle styling constraints or requirements.

Referring again to FIG. 3, in another embodiment, the camera system 12 may further include an aggregator component 56 connected to the first end 34 and configured for collecting the airstream 38. That is, the aggregator component 56 may collect, aggregate, or funnel the airstream into the channel 32. As such, the aggregator component 56 may have a comparatively larger width or diameter than a width or diameter of the channel 32 and may passively collect the airstream 38 as the vehicle 10 travels along a road surface. For this embodiment, the aggregator component 56 may be disposed at the proximal edge 48, and the duct 130 may extend through the void 54 and protrude from the surface 52. Therefore, the aggregator component 56 may passively collect the airstream 38 as the airstream 38 travels over a roofline (not shown) and/or a rear window glass (not shown) of the vehicle 10 during vehicle operation. That is, the aggregator component 56 may collect the airstream 38 at an aerodynamic region or location of comparatively high pressure to thereby provide a comparatively non-contaminated or clean airflow, i.e., the airstream 38, through the channel 32 to the camera 20 and lens 22. As such, the aggregator component 56 may be useful for efficiently directing the airstream 38 to the channel 32 and the debris region 26 as the vehicle 10 travels at relatively high speed, e.g., highway speeds of greater than or equal to about 70 kilometers per hour.

Referring now to FIG. 4, in another embodiment, the camera system 12 further includes an air mover 58 attached to the first end 34 and configured for pushing the airstream 38 through the channel 32. That is, the air mover 58 may actively drive or force the airstream 38 through the channel 32 towards the debris region 26. For example, the air mover 58 may be selectively transitionable to an electrically powered state (shown generally at 60) in which the air mover 58 pushes the airstream 38 from the first end 34 to the debris region 26. The air mover 58 may be powered by an electric system (not shown) of the vehicle 10 and may only draw power to force the airstream 38 through the channel 32 during certain vehicle operating conditions, e.g., when windshield wipers are operating and/or when the vehicle 10 travels in reverse. As such, the air mover 58 may actively move the airstream 38 through the channel 32 even when the vehicle 10 is traveling at relatively low speeds, e.g., at speeds of less than about 70 kilometers per hour. That is, the air mover 58 may force the airstream 38 through the channel 32 to thereby provide a comparatively non-contaminated or clean airflow through the channel 32 to the camera 20 and lens 22 regardless of vehicle speeds.

By way of non-limiting examples, the air mover 58 may be a fan or compressor that may push or force the airstream 38 through the channel 32. More specifically, with continued reference to FIG. 4, the air mover 58 may be attached to the surface 52 of the decklid 116 and disposed between the first edge 42, the second edge 44, the proximal edge 48, and the distal edge 50. Therefore, the air mover 58 may be hidden from view when the decklid 116 is disposed in the closed position 46 (FIG. 3).

Figure 5:
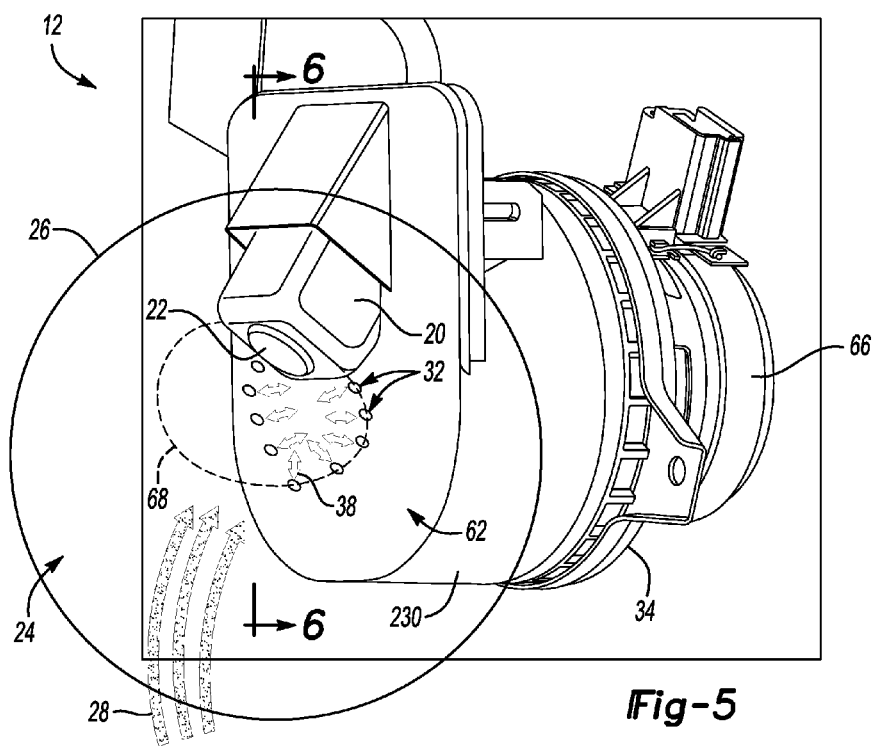
FIG. 5 is a schematic illustration of a further embodiment of the duct of FIG. 2.
Figure 6:
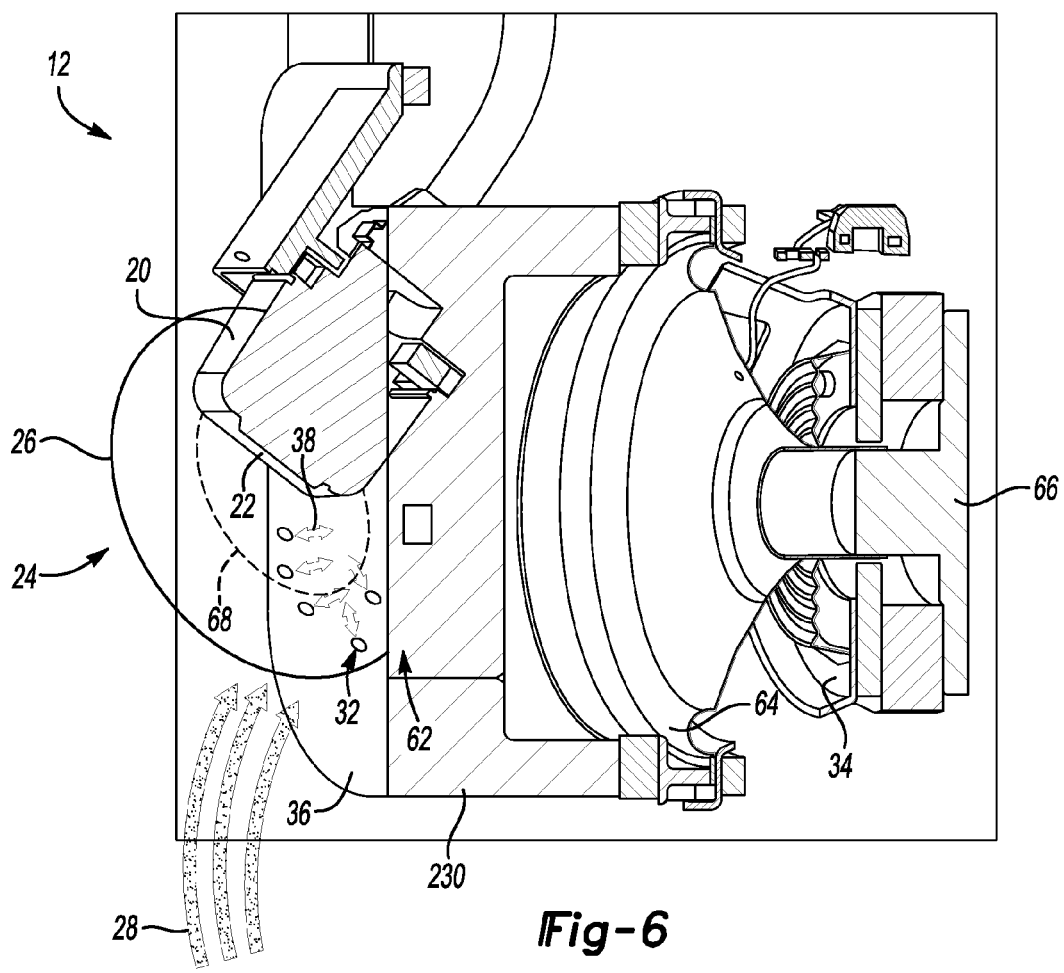
FIG. 6 is a schematic illustration of a cross-sectional view of the duct of FIG. 5, taken along section lines 6-6.

Referring now to FIGS. 5 and 6, in a further embodiment, the duct 230 may also define a plurality of channels 32 therein arranged in a circular array 62 about the debris region 26. The duct 230 may be configured for directing the airstream 38 through the plurality of channels 32 from the first end 34 to the debris region 26. As best shown in FIG. 5, each of the plurality of channels 32 may be spaced apart from one another at the second end 36 and arranged in the circular array 62 about the debris region 26. That is, the circular array 62 may be disposed within the debris region 26 and surround the lens 22.

As described with reference to FIG. 6, for this embodiment, the duct 230 may include a membrane 64 configured for alternately translating toward and away from the second end 36 to alternately thereby push and pull the airstream 38 towards and away from the debris region 26. Further, by way of a non-limiting example, the camera system 12 may include a piezoelectric actuator 66 attached to the duct 230. The piezoelectric actuator 66 may be configured for vibrating the membrane 64 to alternately push and pull the airstream 38 towards and away from the debris region 26. That is, the piezoelectric actuator 66 may include a piezoelectric material that produces an electric current under mechanical load and conversely changes shape in response to an electrical current. The piezoelectric actuator 66 may therefore actuate the membrane 64, i.e., vibrate or alternately translate the membrane 64, on demand upon application of the electric current. Such pulses or alternate push and pull of the airstream 38 may decouple the contaminant current 28 from the debris region 26 surrounding the lens 22 and thereby shield or protect the lens 22 from debris, contaminants, and/or moisture.

As such, the vehicle 10 may further include a shield 68 formed by the airstream 38 at the debris region 26 that is configured for displacing or diluting the contaminant current 28. The shield 68 may be a zone having a comparatively higher pressure than a pressure of the debris region 26 and may therefore prevent the contaminant current 28 from depositing contaminants onto the lens 22. For example, the airstream 38 ejected from the plurality of channels 32 may flow across the debris region 26 to form the shield 68 having a first air pressure. Likewise, the contaminant current 28 may flow towards the debris region 26 such that the debris region 26 has a second air pressure that is less than the first air pressure. Therefore, the airstream 38 may pierce or intersect or disrupt the contaminant current 28 to form the shield 68 and protect the lens 22 from contaminants.

Stated differently, referring again to FIGS. 3-5, the contaminant current 28 may be disposed in fluid communication with the airstream 38 by way of the duct 30, 130, 230 and channel(s) 32. As such, the contaminant current 28 may be displaceable or interruptible by the airstream 38 that is directed through the channel(s) 32 such that the airstream 38 dilutes the contaminant current 28. Further, the duct 30, 130, 230 may passively (FIGS. 2 and 3) or actively (FIGS. 4-6) conduct the airstream 38 into the debris region 26 to pierce or intersect or interrupt or displace or dilute the contaminant current 28 such that the contaminant current 28 cannot deposit debris, contaminants, and/or moisture onto the lens 22.

Therefore, the vehicle 10 and camera system 12 protect and shield the lens 22 from obstruction by and/or coatings of debris, contaminants, and/or moisture without the use of, for example, wipers, protective coatings, jets for ejecting a liquid, and the like. As such, the lens 22 remains clean and operational for collecting light so that the camera 20 may produce an image, even for operating conditions in which the vehicle 10 travels through or is exposed to dust, dirt, rain, snow, grease, and/or tar. In addition, the aforementioned camera systems 12 are compact, economical to manufacture and assemble into the vehicle 10, and are deployable from the cavity 18 (FIG. 1) to reduce obscuration of the lens 22.

While the best modes for carrying out the disclosure have been described in detail, those familiar with the art to which this disclosure relates will recognize various alternative designs and embodiments for practicing the disclosure within the scope of the appended claims.

The invention claimed is:

1. A camera system for a vehicle, the camera system comprising:
   a body defining a cavity therein;
   wherein the body is a decklid having:
      a first edge;
      a second edge spaced apart from the first edge;
      a proximal edge abutting the first edge and the second edge;
      a distal edge spaced apart from the proximal edge and abutting the first edge and the second edge; and
      a surface extending between the first edge, the second edge, the proximal edge, and the distal edge and defining a void therethrough;
   a camera including a lens, wherein the camera is disposed in a deployed position such that the lens protrudes from the cavity;
   a debris region covering the lens;
   a duct disposed within the cavity, defining a channel therein, and having a first end spaced apart from the camera and a second end spaced apart from the first end, wherein the duct is configured for directing an airstream through the channel from the first end to the debris region; and
   an aggregator component connected to the first end and configured for collecting the airstream;
   wherein the duct extends through the void and protrudes from the surface and the aggregator component is disposed at the proximal edge.

2. The camera system of claim 1, wherein the second end is disposed in fluid communication with the debris region such that the second end ejects the airstream into the debris region.

3. The camera system of claim 1, further including an air mover attached to the first end and configured for pushing the airstream through the channel.

4. The camera system of claim 3, wherein the air mover is selectively transitionable to an electrically powered state in which the air mover pushes the airstream from the first end to the debris region.

5. The camera system of claim 3, wherein the air mover is attached to the surface and disposed between the first edge, the second edge, the proximal edge, and the distal edge.

6. A camera system for a vehicle, the camera system comprising:
   a body defining a cavity therein;
   a camera including a lens, wherein the camera is disposed in a deployed position such that the lens protrudes from the cavity;
   a debris region covering the lens; and
   a duct disposed within the cavity and defining a plurality of channels therein arranged in a circular array about the debris region, wherein the duct has a first end spaced apart from the camera and a second end spaced apart from the first end, and is configured for directing an airstream through the plurality of channels from the first end to the debris region.

7. The camera system of claim 6, wherein each of the plurality of channels is spaced apart from one another at the second end.

8. The camera system of claim 7, wherein the duct includes a membrane configured for alternately translating towards and away from the second end to thereby alternately push and pull the airstream towards and away from the debris region.

9. A vehicle comprising:
a frame;
an airstream flowable around the frame;
a camera system including:
 a body attached to the frame and defining a cavity therein;
 a camera including a lens, wherein the camera is disposed in a deployed position such that the lens protrudes from the cavity;
 a debris region covering the lens; and
 a duct disposed within the cavity, defining a plurality of channels therein each spaced apart from one another and arranged in a circular array about the debris region;
 wherein the duct has a first end spaced apart from the camera and a second end spaced apart from the first end, and is configured for directing the airstream through the channel from the first end to the debris region; and
a contaminant current disposed in fluid communication with the airstream.

10. The vehicle of claim 9, further including a shield formed by the airstream at the debris region and configured for displacing the contaminant current.

11. The vehicle of claim 9, wherein the second end is disposed in fluid communication with the debris region such that the second end ejects the airstream into the debris region.

12. The vehicle of claim 9, wherein the body is a decklid having:
a first edge;
a second edge spaced apart from the first edge; and
a surface extending between the first edge and the second edge and defining a void therethrough; and
further wherein the duct extends from the first edge through the void and protrudes from the surface.

13. The vehicle of claim 9, further including an air mover attached to the first end and configured for pushing the airstream through the channel.

14. The vehicle of claim 9, wherein the duct includes a membrane configured for alternately translating towards and away from the second end to thereby alternately push and pull the airstream towards and away from the debris region.

15. The vehicle of claim 14, further including a piezoelectric actuator attached to the duct and configured for vibrating the membrane.

* * * * *